(12) United States Patent
Budleski (10) Patent No.: US 9,097,513 B2
(45) Date of Patent: Aug. 4, 2015

(54) OPTICAL LASER SCANNING MICROMETER

(76) Inventor: William Frank Budleski, Raleigh, NC (US)

( * ) Notice: Subject to any disclaimer, the term of this patent is extended or adjusted under 35 U.S.C. 154(b) by 0 days.

(21) Appl. No.: 14/241,468

(22) PCT Filed: Sep. 12, 2012

(86) PCT No.: PCT/US2012/054865
§ 371 (c)(1),
(2), (4) Date: Feb. 27, 2014

(87) PCT Pub. No.: WO2013/040035
PCT Pub. Date: Mar. 21, 2013

(65) Prior Publication Data
US 2014/0204400 A1    Jul. 24, 2014

Related U.S. Application Data

(60) Provisional application No. 61/534,990, filed on Sep. 15, 2011.

(51) Int. Cl.
*G01B 11/02* (2006.01)
*G01N 21/00* (2006.01)
*G01N 21/19* (2006.01)
*G01B 11/08* (2006.01)

(52) U.S. Cl.
CPC .............. *G01B 11/02* (2013.01); *G01B 11/08* (2013.01)

(58) Field of Classification Search
USPC ................ 356/237.1–241.6, 242.1–243.8, 356/426–431, 600–640
See application file for complete search history.

(56) References Cited

U.S. PATENT DOCUMENTS

| | | | | |
|---|---|---|---|---|
| 3,687,520 A * | 8/1972 | Nothnagle et al. | ............. | 359/376 |
| 4,492,473 A * | 1/1985 | Richter et al. | ................. | 356/640 |
| 4,833,489 A * | 5/1989 | Byung-Sik | ...................... | 347/261 |
| 5,009,233 A * | 4/1991 | Petrohilos | ...................... | 600/479 |
| 5,432,537 A * | 7/1995 | Imakawa et al. | ............... | 347/135 |
| 6,940,593 B2 * | 9/2005 | Farr | ............................... | 356/326 |

* cited by examiner

*Primary Examiner* — Kara E Geisel
*Assistant Examiner* — Jarreas C Underwood (57) ABSTRACT

The present invention provides multiple improvements to optical-based laser scanning micrometers and providing a small handheld version laser scanning micrometer based on the these improvements. For added accuracy and reduction in unit size, a double sided coated mirror receiver reflects the beam back into the transmitter light source. For added accuracy, a Ronchi rule is repositioned one or more times to calibrate additional lookup table correction values. To compensate for barometric pressure change and temperature, two additional reference edges are added to be combined with the reference edges in the transmitter to generate to null out pressure and temperature at the passline measurement area. To minimize beam errors and for part locating, a third derivative is detected. Two or more parallel scanning beams are generated to null out cosine errors and to measure, taper and spherical parts.

12 Claims, 5 Drawing Sheets

OPTICAL LASER SCANNING MICROMETER

This application claims priority of U.S. provisional application No. 61/534,990 filed on Sep. 15, 2011 and is included herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to optical laser scanning micrometers. More particularly, the present invention relates to optical laser scanning devices and system with improved accuracy.

2. Description of Related Art

Existing laser micrometers have a major short coming of the lack of a spacial filter resulting in allowing slightly off axis reflected and diffracted light being detected coming off of the part being measured. The reason for the problem with existing laser micrometers is a small spot diameter (the diameter of the laser beam) is in range of about 0.1 mm to 2 mm at the measurement area of the passline. From that point the scanning beam diverges to a larger diameter entering the receiver, creating a relatively large spot being focused on the receiver photo diode. The focal point of the scanning laser beam and the focal point of the focused small spot are at two very different distances from the receiver lens. This problem is side stepped, in some products, by designing a relatively collimated beam of larger diameter and of relatively constant size, with a precise long focal length or multi element receiver lens. This arrangement will produce a very small spot diameter allowing use of a small diode reducing off axis light issues. The problem with this type unit is it has even worse accuracy and repeatability short comings than previous devices due to the difficulty of detection of the much larger spot diameter as it scans the parts to be measured at the measurement location. The slightest defects in the transmitter optics, which are impossible to eliminate, will worsen the micrometer's performance even further. Due to the much larger beam diameter at the passline with calibration of the measurement field by a Ronchi rule, a much larger line and gap spacing is needed reducing the number of lookup table values for correction of optical errors between points.

In the 1980s, Lasermike produced a simple mirrored receiver of different detection having short comings including any trace of frame flex affected accuracy and lack of detecting a symmetrical Gaussian laser beam spot shape. It was fairly inaccurate in its measurements. This device involves a laser being shined on a rotating mirror. The scattered light divides in an arc into a collimating lens creating a collimated scanning beam which is utilized to measure the thickness by measuring the missing collimated laser light.

BRIEF SUMMARY OF THE INVENTION

This invention pertains to offering higher accuracy and added features to traditional existing scanning gauges while minimizing design issue problems. This invention offers dramatic increase of accuracy across the measurement region comparing diameters relative to edges. It also minimizes errors when measuring clear tubes as well as certain surfaces having different reflectivity characteristics resulting in measurement error. Most of the invention improvements are required for manufacturing a small highly accurate handheld scanning laser gauge. This mirrored receiver invention design has another innovation by returning the beam exactly where it came from but slightly off axis with the optical scanning effect first being nulled out at the scanner mirror reflecting in two stationery beams near beam waste (smallest diameter) detected by two small light sensing diodes just above and below the output beam of the laser light source.

In one embodiment, the invention relates to an optical scanning laser micrometer for measuring the size of an object, the micrometer having a laser shining a beam on a rotating scanner mirror wherein the rotating scanner mirror scatters light which divides in an arc into a collimating lens creating a collimated scanning beam comprising:

a) a mirror having a top and bottom positioned to receive the collimated laser beam wherein the object is placed between the lens and the mirror for measurement, the mirror comprising a front surface facing the lens, the front surface having reflectivity of between about 5 percent and 50 percent and a back surface facing the lens, the back surface having a reflectivity of between about 5 percent and 100 percent;

b) wherein the front and back surface are farther apart at the top than the bottom in a manner that the angle between the beam hitting the front and back surface is each greater than 90 degrees and less than 120 degrees; and c) wherein there is a pair of spaced apart light detecting diodes positioned between the laser and the rotating mirror further positioned to receive the beam reflected off of the front and back surface which passes back through the lens, reflect off the rotating scanner mirror and reflect it to the light detecting diodes.

DETAILED DESCRIPTION OF THE INVENTION

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "about" and "essentially" mean ±10 percent.

The term "comprising" is not intended to limit inventions to only claiming the present invention with such comprising language. Any invention using the term comprising could be separated into one or more claims using "consisting" or "consisting of" claim language and is so intended.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "object" means the item being measured by the micrometer. A circular or multiple circular or other shaped objects placed within the measurement field above one another for measurement. Similar to an optical comparator object measurement but of a single Y axis or parallel Y axis of known X axis width for measuring. The object could have cut out portions resulting in only one light to dark and dark to light transition or of multiple transitions of these for measurement.

As used herein the term "laser" means for this application a highly amplified narrow coherent beam of light of a single frequency of ten to less than one milliwatts in power.

As used herein, the term "lens" means for this application comprised of one or more spherical or holographic elements.

As used herein the term "receiver mirror" means the invention's wedge receiver mirror which allows significant reduction on the receiver size of the micrometer, permitting utilizing the precision transmitter optics for the received signal and allowing a spacial filter approach in the transmitter side stepping many areas of light detection problems in the traditional receiver lens design. This special mirror of the invention has a top and bottom and has a front surface facing the collimator lens having a reflectivity of between about 5 percent and about 50 percent with the remainder of the light passing through the front surface. It has a back surface also facing the collimator lens having a reflectivity of between about 5 percent and 100 percent of the light passing through the front surface and reaching the back surface. In prior art mirrors there is a single reflective surface perpendicular (90 degrees) which is 100 percent reflective. In the present invention the front and back surface are farther apart at the top of the mirror than at the bottom in a manner that the angle between the columnar laser beam hitting the front and back surface is each greater than 90 degrees and less than about 125 degrees.

After the scanning beam passes the object to be measured in the measurement field, a portion of the beam reflects off of the front face of the mirror returning just above the collimated scanning field barely clearing the object on the return trip. The second beam reflects off of the back side of the mirror, and is slightly angled below the collimated field and is blocked by the part. On the lower portion of the object of measurement, the opposite effect occurs. It does not matter if the wedge receiver mirror is orientated at the thin end on the top or on the bottom. This mirror from one beam input returns two beams of light of slightly different angles allowing each of the two beams to clear the part even when the beams at the part passline having a small beam diameter. With no coating on the front surface, depending on the glass could work as well though one of the transitions of light to dark will be weak and the other strong.

Instead of the wedge receiver mirror in another embodiment, there is a single conventional mirror of two wedge angles on the upper half reflecting the beam slightly back above the scanning field and on the lower half reflecting slightly back below the scanning field. The short coming is that all parts must be in the center of the field and can only measure solid two sided parts. The design becomes clear from the figure showing this arrangement but the remainder of the device of the invention is the same.

As used herein the term "scatters light to a lens" refers to the action of the spinning mirror which takes the laser beam and reflects it into a spread pattern by sweeping vertically (the "y axis") through the lens.

As used herein the term "laser micrometer" means a laser operated device for making measurements of an object placed in the measurement beam. The prior art teaches machines, such as the BenchMike 283 series, which allow measured means of objects placed in the measurement beam. The BenchMike 283 series product brochure is incorporated herein by reference. The present invention utilizes the basic rotating mirror and laser source detailed therein along with a collimator lens to send a columnar laser beam across a space. However, the receiver for the particular device in the present invention is novel as shown herein. The mirror used herein replaces the collector lens and the pair of receptor diodes is placed between the rotating mirror and laser rather than behind the collector lens. As shown in that reference a number of different measurements can be made.

As used herein the term "spaced apart light detecting diodes" means the present invention optical scanning laser micrometer apparatus wherein it includes two light detecting diodes for receiving bounced light after measurement of the scanned object. The diodes are located between the scanning rotating mirror and the laser light source. On their return trip the beams bounce off of the rotating mirror and in one embodiment they are placed close to the laser beam separated by enough distance for the beam to pass between them. Obviously they will be located in a position where the beams will strike the detectors. One diode is for detection of light transition from light to dark of measured part edge and the other is for detection of light transition of dark to light. One location for diode placement is at point of smallest beam diameter and utilizes smallest diodes possible, small masks or other object in front of the diodes for minimizing off axis light detection. Selecting detector diodes is within the skill in the art in view of this disclosure.

As used herein the term "Ronchi rule" means a photo mask glass plate of parallel equal width of lines and gaps.

As used herein the term "auto calibration reference edges" means a reference piece of flat material glass, metal or other material of two reference edges placed perpendicular and within the path of the scanning laser beam. The reference edges are typically of narrow slits to capture a small portion of the diameter of the scanning laser beam. The reference's edges are normally just beyond the field view of collimating lens. Its purpose is to measure the scan velocity in time from point to point to which the scanned time of an item in the measurement field its transition of light to dark and dark to light is referenced to. The auto calibration compensates for scanner motor speed variations and some of the laser micrometer dimensional instability. Behind the two reference edges are two light detecting photo diodes. Often of which is referred to as a start diode to start counting time and the second is often referenced to as stop diode to stop counting time. The measures items in time from "light to dark" to "dark to light" is measured relative between the start and stop diodes time frame.

As used herein the term "measurement field" means the portion of the laser scan where an object/objects must be placed in order for it to be measured by the sensor array of transmitter and receiver.

As used herein the term "derivative signal" in this particular application is to detect the point of the fastest change in voltage (light) of transition of scanning a part's edge of light to dark or dark to light which is close to the half way point of the point of the center of the laser Gaussian beam spot shape. The first derivative signal replicates the spot shape and the second derivative generates a zero crossing point of positive to negative voltage or negative voltage to positive. The third determines the spot shape. Derivatives are described here as an example.

http://docs.scipy.orgg/docs/scipy/reference/tutorial/signal.html

As used herein the term "off axis" for the rotating scanning mirror means the mirror faces (plane) is not in line with the rotating axis of the motor shaft.

As use herein the term "small glass wedge window" means for this application is comprised of a window for light transmission positioned within the laser output beam at a significant angle allowing a portion of the beam to pass directly through with another portion reflecting off both inner surfaces before escaping offset compared to the first output beam. The specific wedge angle of the window (the back and front faces of the window not being parallel to one another) forces the beams to converge on the scanner mirror. This wedge can be comprised of a singular or multiple pieces of glass.

A great deal of accuracy loss is due to errors between the lookup table's correction values. These errors are localized errors mostly in the collimator lens to a lesser extent in other locations the beam passes through, such as windows. If the mirrored unit is calibrated with a Ronchi rule, the gap and line spacing must be increased slightly in size, limiting the number of lookup table correction points. To side step this problem and to greatly increase the accuracy of all gauges, another innovative feature is added. After gathering data of lines and gaps for the first set of lookup tables moving a positioned Ronchi rule up or down just a portion of a line spacing, a second set of data points is gathered and move the Ronchi rule a set amount again, then gather another set of data points, and so forth, gathering many times added lookup table correction point values. If the Ronchi rule movement is not precisely known by the fixture, the gauge will know precisely based on the average differential of readings from the first set of data and second set of data.

This method will greatly enhance the accuracy of the gauge since multiple correction tables are added well under the beam spot diameter. Very localized optical errors would mostly be nullified out due to multiple correction values over the region of defect. A collimated unit with a large beam spot size at the measurement region would result in drastically improved performance.

Conventional scanning laser systems utilizing a collimator lens are very sensitive to barometric change due to the change of index of refraction of air relative to the index of the glass lens affecting beam collimation resulting in the gauge being out of specification related to elevation above sea level or by low pressure weather systems. This invention device and the method of using it will in effect generate auto calibration references equivalent to being at the measurement passline region. By adding two precision invar reference edges or other material on or near the receiver mirror or by the conventional receiver lens near the top and bottom edge of the field generating a dimensional spacing reference, this added reference dimension is averaged with the internal reference edges also of invar. (On a Zygo gauge the internal references are sometimes referred to as an auto calibration in the art.) This will null out the atmosphere errors at the part measurement region location. If the measurement region is optically closer to one set of reference edges by a given percentage, then the scaling of those reference edges are increased accordingly. Due to temperature transition, the components and structure of transmitter's optical path out to the measurement region reacts at different lag time rates creating transitional temperature measurement errors. These added reference edges will compensate to a greater degree for these transitional temperature measurement errors. Instead of added reference edges by the receiver, the auto calibration invar by the lens could intrude into the measurement return beams to generate the edges though the much larger spot size would worsen repeatability unless a longer sample time is accumulated for these two edges.

The previous art's first and second derivative approach for determining the center of the scanning Gaussian beam works well for approximating the center of the spot. The more accurately the exact spot center is detected by less filtering the gauge's performance will actually worsen do to detecting very subtle artifacts of the collimating lens and windows which create subtle higher frequency noise errors preventing detecting the exact center of the beam. This center of the beam is also referred to the point of the scan pulse or light pulse of scanning the parts edge light to dark or dark to light at the point of steepest slope. The point of steepest slope is close to the half way point of beam intensity. In what is referred to as "Z" networks in creating the bandwidth and optimal gain of these first and second derivatives is also creating filtering which is actually instead of detecting an exact zero voltage signal cross over point sampling a region of steepest slope of around the half way point of light to dark and dark to light transition or is actually sampling the average area of the center of the spot. With the use of beam expanders, certain collimator lenses will cause a distorted Gaussian beam shape. By adding the detection of a third derivative, it will add two more data points for sampling the spot shape (coma) and size to compensate for its positional errors as well as averaging out system noise and improving repeatability. Just like the prior art, the amplitude beyond a certain threshold of the first derivative will allow detection the zero voltage crossover point. The second derivative amplitude will open the gate for referencing the zero crossing of the third derivative. Laser diodes and their beam shaping optics will benefit with the addition of the third derivatives to compensate for beam shape errors. Considerable difficulty has occurred in the past due to lack of symmetry of the Gaussian beam and its impact on accuracy.

In one embodiment, a handheld unit can be built to have a very large depth of field, two sets of Ronchi data points near and far from the transmitter can be obtained to generate lookup tables. The distance of the part from the transmitter is determined by spot size. The farther from beam waste the part being measured is located, the greater the third derivative signals are spaced apart within the longer duration Gaussian beam spot size. This smallest spot size (beam waste) can be set closest or farthest measurement point from the transmitter. Another method for better overall accuracy for a large depth of field is to have beam waste center distance from the transmitter and mirror and introduce a very small amount of coma in the spot shape. The second derivative will be slightly offset relative to the center of the two-third derivative signals. Due to coma, the offset reverses from the side of beam waste closer to the transmitter relative to the other side toward the mirror. This will not only provide the distance from beam waste, but also provide which side of beam waste the part is located at.

In another embodiment for the rotating scanner mirror if at least one of the scanner mirror surfaces is positioned slightly off centerline for creating a slightly non collimated field the object's difference in scan time relative to the other scans of the object will indicate which side and distance from beam waste the object is located. If the laser beam instead of illustrated at 40 degree angle relative to the collimated field but is of 90 degrees will result in a collimated field but of slight slope relative to other scans shifting the object scan height position relative to the auto calibration position. This amount in differential in scan time relative to the other scans determines which side and distance the object is from beam waste allowing the scaling for compensation of errors. The amount the mirror surface is off center must be slight or else detector diodes 15 and 16 must become larger or of multiple detecting surfaces and in FIG. 1 the mirror 1 will require the bottom 4 being much thinner than the top.

If a Ronchi rule is utilized in calibration, the optical effects of diffraction will always cause lines to read smaller in size than gaps. The typical traditional approach is creating a hysteresis value by taking the differential out between the full set of average values between gap and line readings. Certain types of conventional systems will measure line and gap spacing non-linear relative of the center of the field to the outer measurement regions of the field. Instead, adding the sum of all the lines and all the gaps and raking the differential portions of the field need to have the differential taken of 10 or 20 lines or so to minimize errors.

For measurement of cosine error when the object is not being measured perpendicular to the beam as in a handheld application, for measurement of part tapers, measurement of spheres, or measurement of stepped height/offset, the scanner mirror is slightly adjusted off axis to create two parallel scanning beams often referred to as a dither or wobble alignment problem. In an example of cosine error, this will result in a differential in height between the two sets of scanning beams. Based on the space between the parallel scanning beams and differential in height, the cosine percentage error is determined and applied to the measured diameter resulting in the correct dimension. For taper measurement based on the parallel beam spacing and the differential in diameters between each set of the scanning beams, the part taper is interrupted. For measurement of the sphere software is set on spherical measurement type. Even if the sphere is not perfectly placed between the two scanning beams the diameter is interpreted based on the differential and size of the readings. For measurement of a narrow grove of a shaft, one scanning field is turned off only referencing the cosine error input if needed. On the auto calibration reference point one of the upper and/or lower diodes will receive a larger, longer or multi pulse modification for sync reference to identify one of the parallel scanning beam fields. These auto calibrations references are typical on machines such as the Zygo, Zmike and Beta LaserMike products. Beyond a simple cosine compensation measurement, if there is need for extreme accuracy, each scanning beam could be calibrated independently. For accuracy of measurement of steep tapers, limited thread measurement applications or small spheres, the parallel beams spacing can be calibrated on the horizontal axis as well to null out horizontal as well as vertical ray pointing optical errors. One such way for calibration for generating correction values of the lookup tables is instead utilizing a traditional Ronchi rule of horizontally equally spaced lines and gaps perpendicular to the scanning beam, two sets of Ronchi rules are placed in the measurement field to gather data of the Ronchi rule lines sloped 10 to 45 degrees positive and the other sloped 10 to 45 degrees negative. The scanner can consist of 2 or more mirror surfaces.

Figure 2:
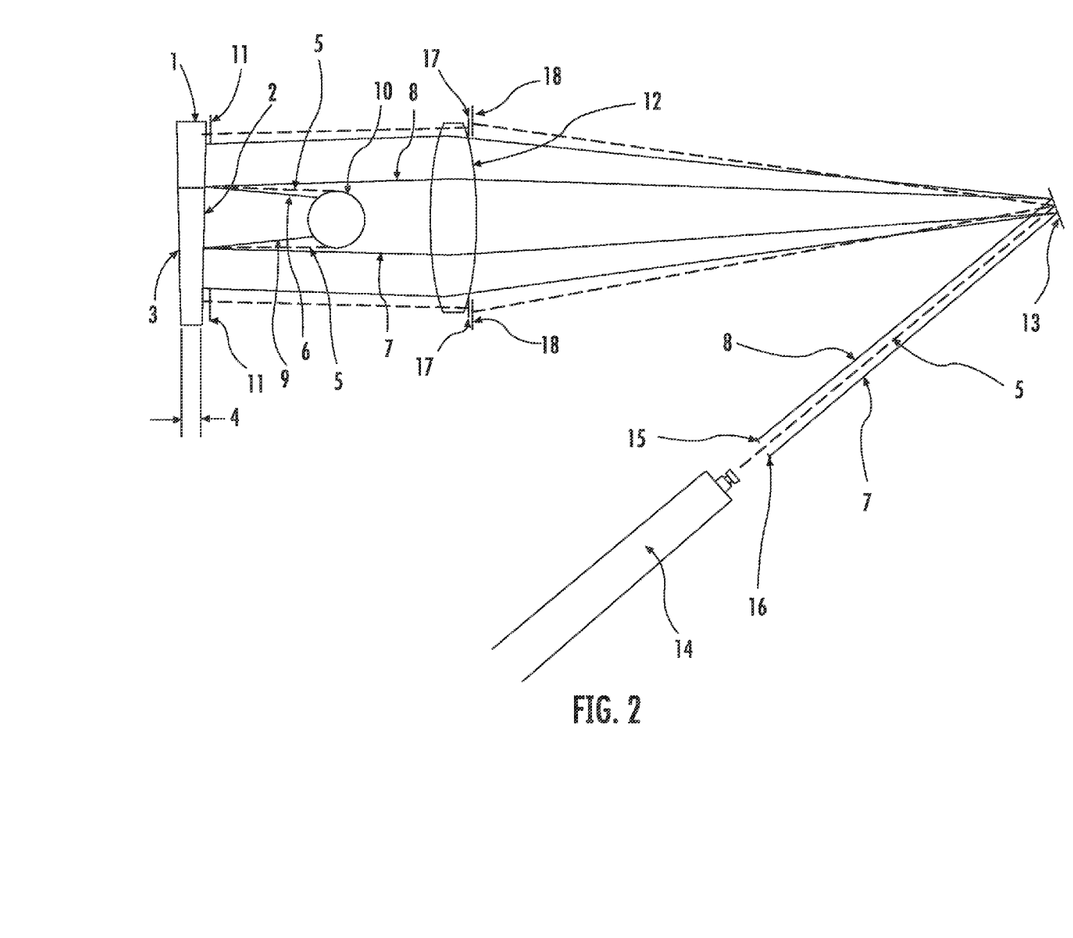
FIG. 2 is a side view of the measurement system of the present invention.

Further referring to FIG. 2 which is a view of the transmitter and the receiver of the present invention together, the light detecting diodes 15 and 16 are located between the scanning rotating mirror 13 and the laser light source 14 which projects beam 5. One diode 15 is for detection of light transition from light to dark of measured part edge and the other diode 16 is for detection of light transition of dark to light. They can be positioned on either side of the beam 5 as shown. The diodes 15 and 16 can be a single or multiple surface for detecting pin reflectively, for compensation of dimensional errors or for detecting return beam ray pointing error caused from measuring a hot object.

A finely pointed beam, dash 5 line progress from the laser 14 to the rotating mirror 13 of which creates the scanning vertical field and in an optional application the mirror is adjusted slightly off axis to create parallel scanning fields of which is partly blocked by the auto calibration of invar (or other material) reference edges 18 which has photo light diodes 17 just behind to capture the first set of calibration edges of scan velocity. With the parallel scanning field, one field is identified from the other for synchronization. Most of the remaining scanning light field passes through the collimator lens 12 creating a collimated scanning field of which is partially blocked by the object 10, thereafter of which the outer edges are partly blocked by the second set of reference edges 11, these edge of measurement field transition edges are returned back into the transmitter and are detected by the photo light detection diode light to dark 15 and dark to light 16. Note these edges are at a selected location but can be located at other locations optically after the collimator lens with varying performance. By comparing the second set of reference edges to the auto calibration reference edges, the second set of reference edges determines the ray pointing error variability caused by thermal and barometric effects. Between the reference edges, the remaining light strikes the wedge shaped mirror 5 of which the bottom 4 is thinner than the top by about two degrees or less in this embodiment. The mirror can be mounted upside down with the same result. This reflected light is split in two directions with about 35 percent or less of the light reflected off the front mirror face 2 slightly downward and the other portion of the light which is reflected off the rear face 3. Note: the returned light off the mirror back through the transmitter is all represented by solid lines. The scanning field of which grazes the part is reflected off of the mirror face 2 is returned angled slightly downward. The light to dark scan transition, the bottom part of the beam upper 6 being blocked by the part and the dark to light scan transition, the lower part of the lower beam 7 missing the part. The backside of the mirror 3 reflects the scanning field angled slightly upward with the light to dark scan transition, the upper part of the upper beam 8 barely missing the part and the lower light to dark scan transition, the upper part of lower beam 9 being blocked by the part. With both scanned transition edges of the scanning field of light to dark beam 8 and dark to light beam 9 reentering the transmitter returning through the region of origin back through the collimator lens 12. Note: if reference edges of 11 were removed, the auto calibration reference edges would intrude into the beam generating the second set of reference edges of lower accuracy but still null out ray pointing errors. These two returned fields of scanning light are reflected off of the rotating scanner mirror 13 and with one field of light to dark transition is collected by light detecting diode 15 and the other field of light dark to light transition is collected by the other light detecting the other light detecting diode 16. From these photo light detecting diodes, the FIG. 3B signals are generated.

An optical scanning laser micrometer apparatus calibrated with a Ronchi rule placed in the measurement field can also be utilized. The minimal gap line width is limited by the beam waste diameter. The first set of collection of data of edges of the lines and gaps are generated for lookup table correction of optical and scan velocity errors. The Ronchi rule is repositioned slightly up or downward to collect the next set of collection of data to generate added lookup tables and is repeated as many times as needed. This allows generating multiple added lookup tables many times smaller than the scanning Gaussian beam size at the measurement location. In FIG. 3A the line 22 and gap 23 of the Ronchi rule (not drawn to scale) are in width about 10 times wider than normal in order to illustrate. After the Ronchi rule is scanned for the first set of data points, the Ronchi rule is raised one-fourth 19 of a gap/line width and a second set of data points are taken, then the Ronchi rule is raised half 20 the gap/line width and another set of data is taken. Then the Ronchi rule is raised the final three-fourths of the gap/line width 21 and another set of data is taken. The resulting data taken generates four times the number of lookup tables with dramatic increase of accuracy.

Figure 1:
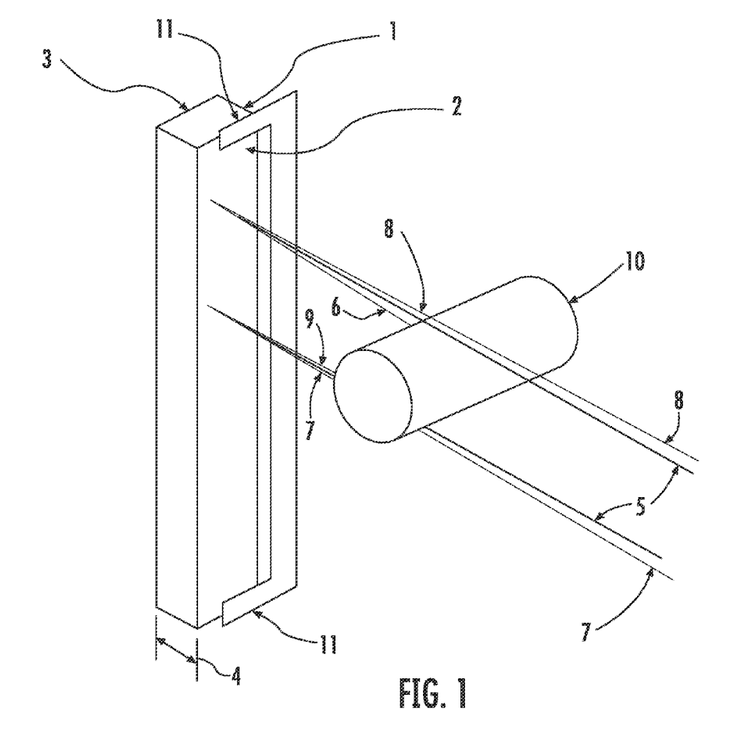
FIG. 1 is a perspective view of a tapered mirror of the invention.

An optical scanning laser micrometer apparatus with an added set of auto calibration reference edges 11 on the outer region of the measurement field optically on the receiver side is shown in FIG. 1. Averaging this optically scanned reference dimension with the transmitter side auto calibration reference 18 in FIG. 2 will null out the errors at the measurement location caused by barometric pressure and temperature variation within the apparatus. The added set of reference edges are known or of minimal temperature expansion/contraction characteristics. If the measurement region is optically closer to one set of reference edges by a given percentage, then the scaling of those reference edge's averages are increased accordingly to make the nulled at region at the measurement passline location.

Figure 3:
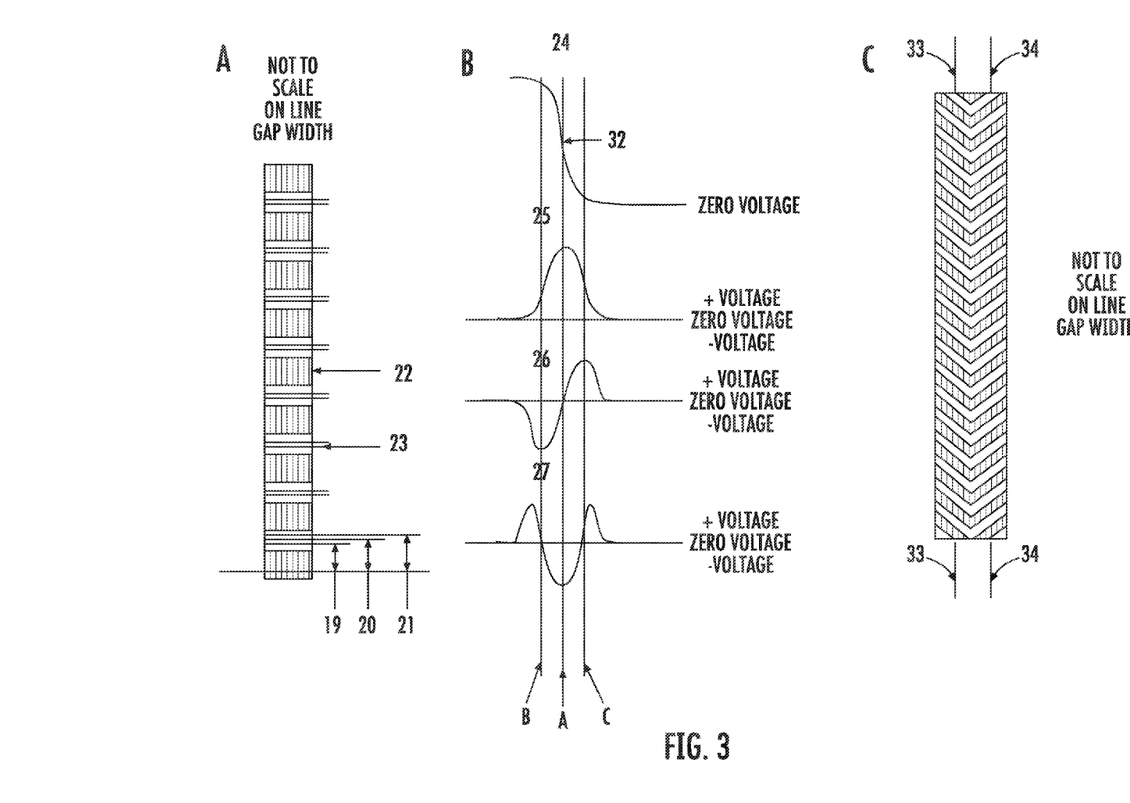
FIGS. 3*a* to 3*c* are examples of Ronchi rule and derivative signals.

For an optical scanning laser micrometer apparatus demonstrating light to dark is illustrated in FIG. 3 B. The dark to light of the light pulse and derivatives are an exact mirror image. From the receiver light detecting diodes the traditional detection of scanning of an object edge of light to dark 24, the half way point of the light pulse 32 is traditionally detected by generating the first derivative signal 25 of which replicates the Gaussian beam spot. Then from the first derivative signal 25, a second derivative signal 26 is generated to detect the center of the Gaussian beam shaped spot by crossing point of zero voltage at a point in time represented by the vertical line position (a) of which is the point of the steepest slope of transition of scanning the part's edge of light to dark. This invention, with the addition of detection of the third derivative signal 27 will provide relative spot (Gaussian beam) size to determine part distance from beam waste (smallest spot) based on the third derivative spacing's of scan time (distance represented by vertical line (b) and (c). The larger the spot size the wider in scan time (distance) represented by vertical lines (b) and (c) to null out coma errors of offset by position (a) to the center of (b) and (c). The part distance from beam waste is determined by the third derivative 27 distance of (b) and (c) the zero voltage crossing point and with a small amount of intentional coma of which one of the two sides of beam waste the part is located is based on if the second derivative 26 zero voltage crossing (a) is closer to (b) or (c) zero voltage crossings. The added references of spot profiling will reduce noise and errors.

The increase of the depth of field accuracy of measurement using the third derivative signal is utilized to determine the part distance from the transmitter. As defined herein instead of one location of data points, two sets of Ronchi data points near and far from the transmitter can be obtained to generate lookup tables. Based on the known part position from the transmitter and known calibration distance of the two Ronchi rule locations, the correction is scaled between the two set of lookup table data points proportionately.

An optical scanning laser micrometer apparatus calibrated by a Ronchi rule as in FIG. 3. A often has a non-linear measurement of optical errors of the gap and line spacing across the measurement field. Instead of sampling the entire field of gaps and lines in total, this invention samples the differential values by grouping only five to forty lines to generate the hysteresis value to null out the differential of readings.

An optical scanning laser micrometer apparatus for measurement of cosine error. FIG. 5B, of the object 46 not being perpendicular to the beams as in a handheld application, for measurement of part tapers, measurement of spheres or measurement of stepped height/offset can be utilized as well. The scanner mirror 39 FIG. 5A is slightly adjusted off axis 41 to create two parallel scanning beams 48 and 49 of about 0.5 to +15 mm spacing depending on measurement range and requirements. The scanner mirror can be of numerous mirror surfaces. This adjusted parallel scanning beam fields 54 FIG. 5B measuring an object 46 with cosine error 55 will result in a differential in height between the two sets of scanning beams. Based on the space between the parallel scanning beams 50 and 51 and differential in height of the object relative to each scanning field, the cosine percentage error is determined and applied to the measured diameter resulting in the correct dimension. For taper measurement based on the parallel scanning beam spacing and the differential in diameters between each set of the parallel scanning beams 52 and 53, the object taper is interpreted. For measurement of the sphere, software is set on spherical measurement type. FIG. 20 depicts a sphere 70, even if not perfectly placed centered between the two parallel scanning beams 58 and 59, the diameter is interpreted based on the differential in each scanning field dimension 56 and 57 and size of the readings and space between parallel scan fields. For measurement of a narrow grove of a shaft, one scanning field is turned off, only referencing the cosine error input if needed. On the auto calibration reference, one of the upper and/or lower diodes 17 will receive a larger, longer or multi pulse modification for synchronization reference to identify one of the parallel scanning beam fields.

An "optical scanning laser micrometer apparatus" as defined herein, wherein extreme accuracy for steep tapers, threads and etc. is needed, each scanning field is calibrated independently vertically and horizontally to correct for errors on both axis's. As shown in FIG. 30 one method is a Ronchi rule of two opposing groups of angle lines which are placed in the measurement field to gather data of the Ronchi rule lines. One Ronchi rule is sloped 10 to 45 degrees positive with the scanning beam placed to pass through at point 33 with data points of edges taken for lookup tables. The other is sloped 10 to 45 degrees negative with the scanning beam placed to pass through at point 34. From the two sets of data, ray pointing and scanning velocity errors are calibrated on both axis's for precise measurement of edges not perpendicular to the scanning beam. A multiple mirror scanner can create multiple scanning fields for example like Roster scanning for profiling such as screw threads.

Figure 4:
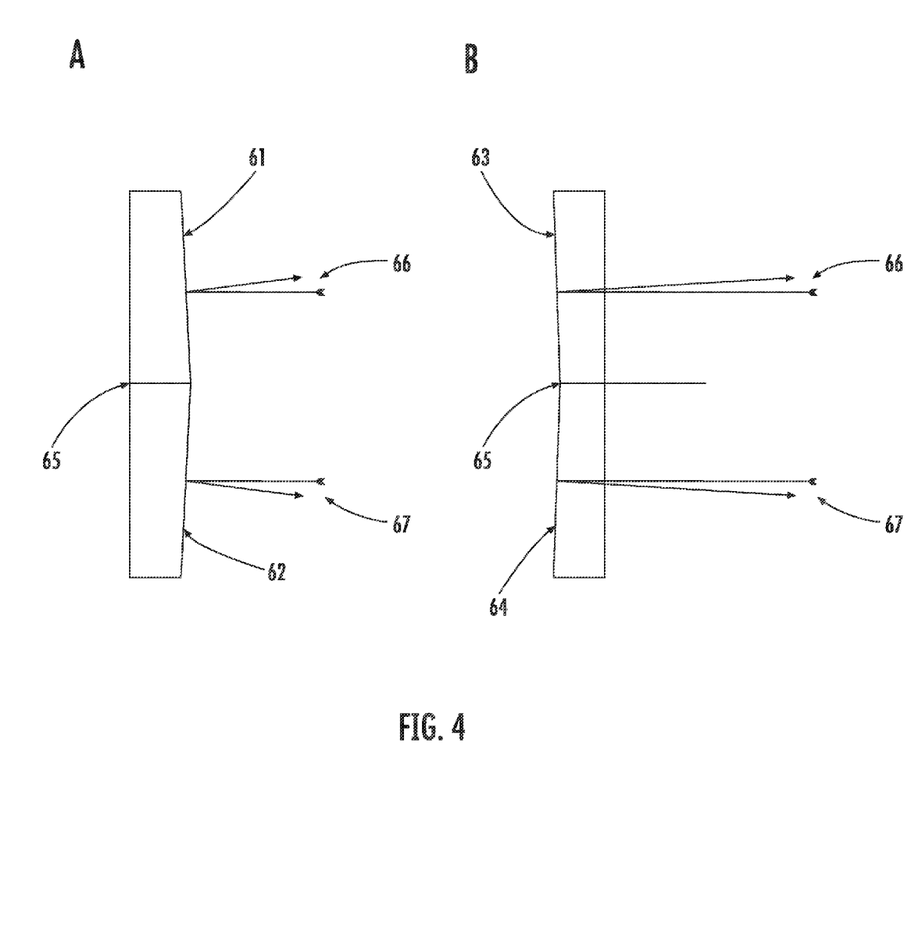
FIG. 4 is a view of a dual angle mirror arrangement.

FIG. 4 depicts alternate receiver mirrors of the present invention other than the one shown in FIG. 1. Mirror A and mirror B provide identical purpose, to reflect the collimated light on the upper half of the mirrors slightly upward 66 and on the lower half of the mirrors slightly lower 67. Mirror A has the reflective surface on the outer surface and mirror B has the reflective surface on the back surface that is the surfaces facing the collimator lens. The difference between the two faces of the two degree or less angle is from the top reflective surface relative to the bottom. Mirror A and mirror B can be a single piece of glass or two pieces with a top and bottom half of minimal spacing at 65. If the mirrors A and B are two pieces, the two degree or less wedge (instead of being in the mirror) is in the mount which holds the mirrors, though mirror B still would need some wedge angle to prevent interference between the front and back surface.

These are of limited applications requiring centrally located solid objects of which the object side of transition of light to dark must be in front of the upper half and the object side of transition of dark to light must be in front of the lower half. It is also limited in smallness in size. Mirrors A and B would save on cost, however, and be of great value in these situations.

FIG. 5A is a top view of parallel scanning fields. From the laser or other light source, the laser beam 42 reflects off of the rotating scanner mirror 39. Due to the angle 41 set between the rotating motor shaft axis of the motor 40, one face of a two sided mirror will reflect the beam toward the backside 43 and the opposing side of the mirror will reflect the beam toward the front side 44 creating two diverging beams every ½ rotation. Due to the scanner motor, mirror surfaces are at the collimator lens focal point, after passage of the two beams through the collimator lens 45 the inner collimating scanning field 48 is parallel to the outer collimated scanning field 49 and are spaced apart at a given distance 54. These two collimated scanning fields will scan the object reflected off the receiver mirror exactly the same as of the side view of FIG. 2. The scaling in this drawing of the parallel scanning beams is very exaggerated though possibly applicable in certain applications. There can be in an embodiment a plurality of scanning fields.

Figure 5:
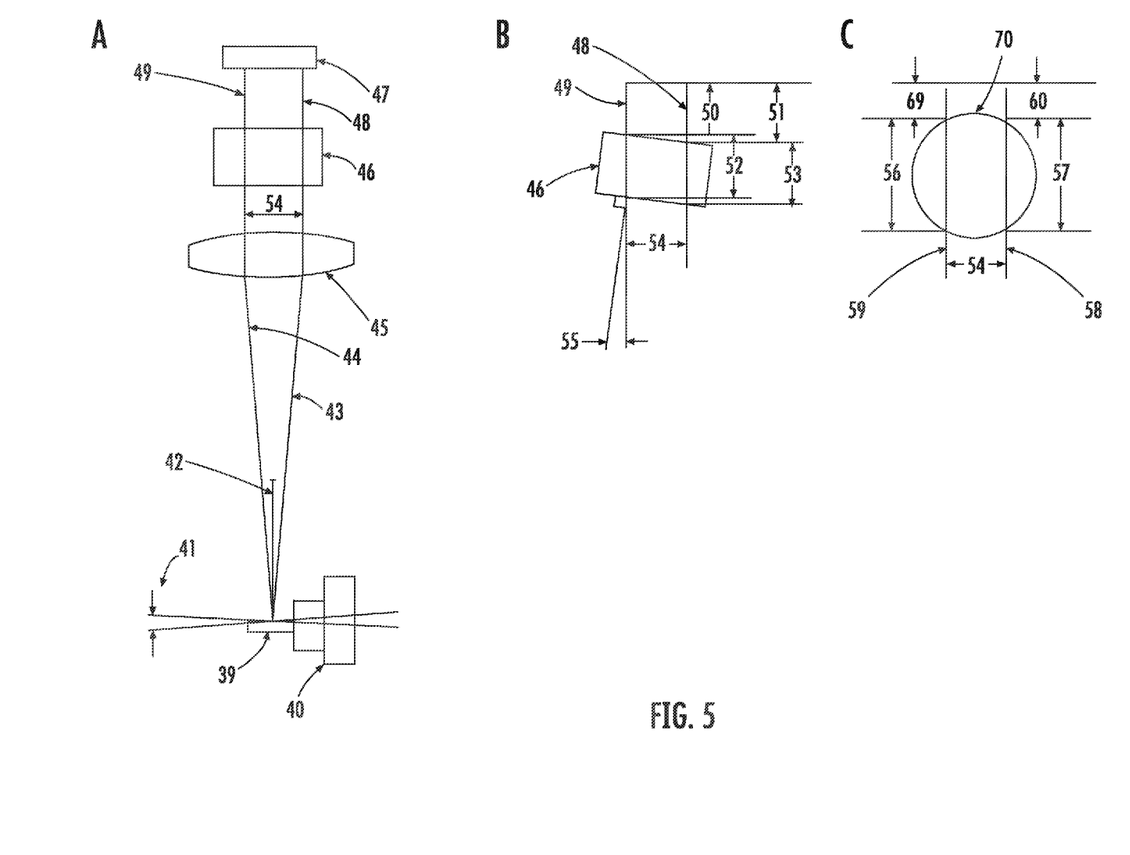
FIG. 5 is a view of a parallel, scanning field arrangement. Addition photos (2) of an actual device are shown.

In another embodiment for creating parallel scanning beams anywhere along FIG. 5. 42 between the rotating scanning mirror and the laser a small glass wedge window is positioned at an angle creating two output beams on each of the same planes as 43 and 44 of which converges on the scanner mirror reflecting on the same opposing plane then as 44 and 43. After passing through the collimator lens it creates two simultaneous parallel scanning fields. This creates twice as many scans per rotation and may simplify a scanner of many surfaces but complicates detection. Ideally the wedge glass is selectively coated to create two stronger beams of equal output as like the receiver mirror's return beams.

With the embodiment of a small glass wedge window between the laser and scanner the diodes at 15 and 16 locations is of side by side active areas with dual output or of separate diodes to detect the side by side focal points at each of the diode 15 and 16 locations created by the wedge window embodiment. This allows detection of each of the nearly simultaneous parallel scan signals independently.

FIG. 5B is a face on view of an object being scanned for measurement. When an object is being measured (for example in a handheld laser scanning apparatus) there will be considerable cosine error as shown in FIG. 5B of one side of the part being lower than the other side in the scanning field creating dramatic error of increase in perceived (measured) dimension. The inner scanning field 48 will measure 51 considerably greater in dimension than 50. Based on the distance between the two scanning fields 54 and the diameters 52 and 53 the actual diameter is interpreted. The differential in dimension between 52 and 53 would indicate the amount of taper there is in the object over the distance of 54 and the degree angle of taper is interpreted.

FIG. 5C is a face on view of a sphere being scanned for measurement. With a measurement type entered in the software for spherical measurement, the diameter is interpreted. By placing a sphere 70 in the approximate center between the inner scanning field 58 and the outer scanning field 59 and based on the space between the scanning fields 54 and based on the measurement distance of cross section 56 and of cross section 57, the diameter of the sphere is interrupted, if there is offset toward inner scanning field 58 or the outer scanning field 59 even with the dimensional difference, the diameter is still interrupted. If distance 69 plus half of 56 does not equal 60 plus ½ of 57, it indicates the sphere is out of round.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. An optical scanning laser micrometer having a laser beam transmitter and receiver for measuring the size of an object placed in a measurement field, the micrometer having a transmitter comprising a laser shining a beam on a rotating scanner mirror wherein the rotating scanner mirror scatters light which diverges in an arc into a collimator lens creating collimator scanning beam, the receiver comprising:

a) a receiver mirror having a top and bottom positioned to receive the columnar laser beam wherein the object is placed between the lens and the mirror for measurement, the mirror comprising a front surface facing the lens, the front surface having reflectivity of between about 1 percent and 50 percent and a back surface facing the lens, the back surface having a reflectivity of between about 5 percent and 100 percent;

b) wherein the front and back surface are farther apart at the top than the bottom in a manner that the angle between the beam hitting the front surface and the back surface is each greater than 90 degrees and less than about 125 degrees; and c) wherein there is a pair of spaced apart light detecting diodes that are positioned between the laser and the rotating mirror further positioned to receive the beam reflected off of the front and back surface of the receiver mirror which passes back through the collimator lens to the scanner mirror which reflects it to the light detecting diodes wherein the light-detecting diode can be of one or more active surfaces.

2. The micrometer according to claim wherein one diode is for the detection of light transition from light to dark and the other diode is for detection of light transition from dark to light.

3. The micrometer according to claim 1 wherein the micrometer is calibrated with a Ronchi rule placed in a measurement field at two locations from the micrometer transmitter.

4. The micrometer according to claim 1 wherein there is a second set of auto calibration reference edges on the outer region of a measurement field after the collimator lens.

5. The micrometer according to claim 1 wherein there is a third derivative signal used to increase the depth of field accuracy and to compensate for any coma optical spot distortion of the micrometer measurement.

6. The micrometer according to claim 1 wherein the rotating scanning mirror is positioned off axis to create two parallel scanning beams of about 0.5 to about 15 mm.

7. The micrometer according to claim 1 wherein the angle between the beam and front and back surface is greater than 90 degrees and less than about 95 degrees.

8. The micrometer according to claim 6 wherein at least two parallel scanning beams measure cosine are used to make multiaxis measurements.

9. The micrometer according to claim 1 wherein the micrometer is calibrated with two different Ronchi rules of opposing angled lines placed in the measurement field to gather data for x and y axis compensation of scan velocity and ray pointing errors of the micrometer.

10. An optical scanning laser micrometer having a laser beam transmitter and receiver for measuring the size of an object, the micrometer having a transmitter comprising a laser shining a beam on a rotating scanner mirror wherein the rotating scanner mirror scatters light which diverges in an arc into a collimator lens which focuses the laser creating a collimated scanning beam, the receiver comprising:

a) a receiver mirror having a top and bottom surface facing the lens positioned to receive the collimated laser beam wherein the object is placed between the lens and the mirror for measurement, the mirror apexing in the middle wherein the top and bottom portion are angled away from the lens by about 1 to 5 degrees either the front or back surface comprising the mirror surface; and b) wherein there is a pair of spaced apart light detecting diodes positioned between the laser and the rotating mirror further positioned to receive the laser beam reflected off of the receiving mirror surfaces which passes back through the lens and reflect it to the light detecting diodes wherein each detecting diode can be a singular or multiple detector to measure rate pointing error if returned off axis light and intensity or parallel simultaneous scanning beams.

11. The micrometer according to claim 1 wherein a small glass wedge window is positioned between the rotating scanning mirror and the laser at an angle to create at least two beams of which converge on the scanner mirror to create at least two parallel scanning beams of about 0.5 to about 15 mm.

12. The micrometer according to claim 1 wherein the rotating scanner mirror of one or more of the scanner mirror surfaces is positioned off centerline for creating at least one of a non collimated field and collimated field not parallel to other collimated fields to determine the object distance from the collimating lens for compensation of errors.

* * * * *